March 30, 1954 C. J. WHITE Re. 23,812
FLORAL RACK
Original Filed April 1, 1946
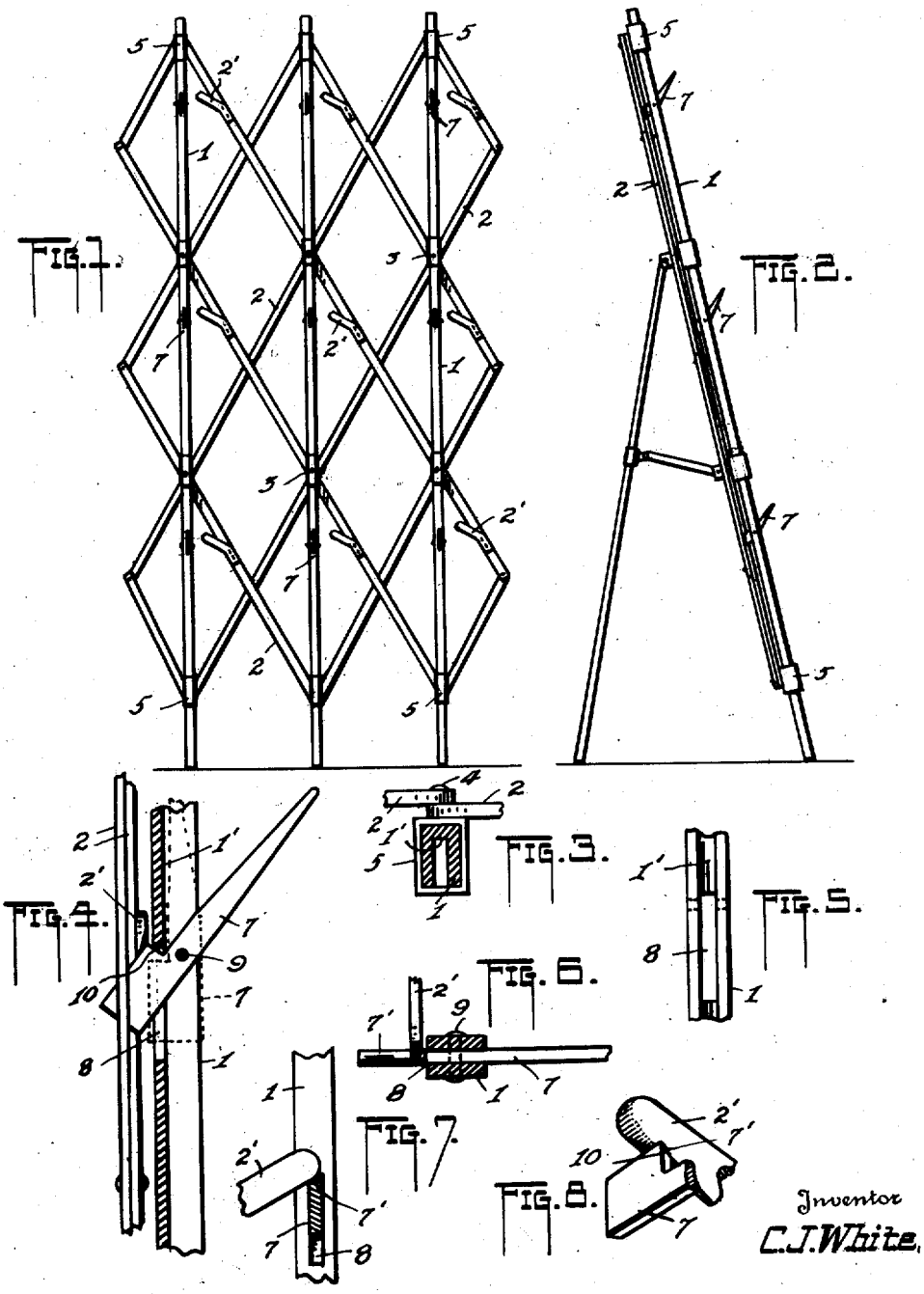
Inventor
C. J. White,
By L. M. Thurlow
Attorney Reissued Mar. 30, 1954

Re. 23,812

UNITED STATES PATENT OFFICE 23,812

FLORAL RACK

Clarence J. White, Colorado Springs, Colo.

Original No. 2,549,352, dated April 17, 1951, Serial No. 658,757, April 1, 1946. Application for reissue April 14, 1952, Serial No. 282,102

12 Claims. (Cl. 248—27.8)

Matter enclosed in heavy brackets [ ] appears in the original patent but forms no part of this reissue specification; matter printed in italics indicates the additions made by reissue.

This invention pertains to improvements in floral racks. More specifically the invention has to do with portable floral racks employed at funerals, as an example, for supporting wreaths, flower pieces, and the like.

An object of the invention is to construct a rack of substantially the type shown in Letters Patent No. 2,115,693 issued to me by the U. S. Patent Office April 26, 1938, but wherein in this instance, a clean front appearance is presented by mounting certain collapsible members behind or rearwardly of the upright supporting legs rather than forward of or in front of said legs, as in said patent.

Another object is to provide a wreath-supporting prong that is pivotally mounted between its extremities on one or more of the named legs and so arranged that a member of the aforesaid members in collapsing at the positions rearward of the legs will engage upon and operate an extended rear portion of the prong to tilt the same and cause it to lie parallel with the leg carrying it, the portion of the prong so engaged being then covered by the said members to prevent said prong leaving its retracted position.

That the invention may be understood the accompanying drawing is presented forming part hereof.

Figure 1 is a front elevation of the rack of the present invention, the customary rearward support therefor not being shown in the interest of clarity;

Figure 2 is a side elevation of the rack showing the rear support therefor;

Figure 3 shows a cross section of a supporting leg of the rack and sleeve adapted to shift thereon;

Figure 4 is a longitudinal section in side elevation of a supporting leg showing a prong pivoted thereon;

Figure 5 is a front elevation of part of the leg shown in Figures 3 and 4;

Figure 6 is a plan of the parts shown in Figure 4 wherein a supporting leg portion is shown in section;

Figure 7 is a rear elevation of part of a leg of the rack, a prong pivoted thereon, and a part to effect movement of said prong in one direction; and Figure 8 shows in perspective parts shown in Figure 7.

In the figures 1 represents one of a plurality of upright supports or legs 1 which carry the parts now to be described. Certain of said parts are identified at 2 to provide a lazy-tongs. These members cross each other diagonally and are pivoted on each other on a pin 3 fixed relative to a leg 1, while at their extremities at the said legs 1 they are jointly pivoted in suitable manner at 4 to sleeves 5 slidable upon and along said legs in both the opening movement and collapsing movement of the members 2 as is usual in racks of this type.

In a study of Figure 1, which shows the face of the rack, it will be noted that the diagonally crossed members 2 lie behind or rearward of the legs 1 as distinguished from other racks of this type, and thus a clear and smooth front appearance is presented.

The legs of the rack support certain flower holding prongs 7 designed to be extended from the front faces of the said legs, while capable of being collapsed so as to lie parallel with the plane of said faces.

In the present instance these prongs 7 are pivoted between their ends on the legs. Also in this instance, the legs may, for convenience, be channel members the rear wall 1′ of which is provided with a slot 8, through each of which is a prong extending rearwardly from a leg as shown in Figure 4, particularly, a pin 9 serving as a pivot for the prong in such manner that the latter may project from both the front and the rear face of the leg. And said prong may be straight throughout in the plane of its pivotal movement, it lying permanently in a plane at right angles to the plane of the rack. The rearwardly extended end of the prong has an abutment at 10 which, when the forward end of the prong is extended to flower holding position, rests against the upper end of slot 8 in the rear wall of the leg as shown in said Figure 4 and thus a sturdy support for any weight placed on the prong's point is provided.

When the rack is collapsed it is desired that the prong be automatically retracted and maintained parallel to the plane of the front surface of the leg 1, and there maintained.

That this may be readily done, the prong 7 is extended at its end rearward of its pivot to lie in the path of collapsing movement of the crossed members 2. In Figures 1 and 7 a member 2 has an extension 2′ which in the collapsing movement of the members abuts upon the top edge of said rear end and by what may be termed a wiping or shearing action depresses that end of the prong and causes the prong-point to be moved to the broken line position in Figure 4, in which it lies substantially within the channel of the leg 1 so that said prong and its companions, as moved, will not project from the rack face. And when fully collapsed the members 2 cover the said rear ends of all of the prongs and maintain the latter in the retracted positions permanently, or until the rack is again spread for use.

In the present instance, as shown in Figures 1, 7 and 8 the part 2' is upwardly directed at its point for the named shearing action as it swings with the member 2 on which it is carried. It is also observed that the top engaged edge of the rear end of the prong is preferably beveled as at 7' as in Figures 7 and 8. Also, the under edge of the part 2' is preferably beveled so that broad engaging surfaces of these elements are presented to each other in the interest of smooth action.

The said part 2' may be attached to a given member 2, or it may be integral therewith.

It is now seen that while the members 2 are rearward of the legs 1 to provide a clean appearance of the rack front, they also provide for directly, automatically, and positively retracting the prongs as well as serving to maintain them in their retracted positions by covering them at their rear extended ends, the parts 2', the while, having no interference with other parts of the structure, since lying in planes spaced from such parts.

While the prongs 7 extend through the slots 8 in this instance, they may be otherwise mounted on the legs and need not necessarily lie within a channel in said legs, it being required, only, in being pivotally supported between their ends on the legs, that, in one of their positions, their extremities project beyond the front and rear faces of the legs, and that in their extreme other positions the forwardly extending portions parallel the front faces of the legs while the extremities of their rear ends lie at least substantially flush with the rear faces of said legs.

The prongs are adapted to tilt by gravity to take up extending positions when the rack is uprighted for use, so that floral display pieces may be supported theron, but retracted by such means as described.

I claim:

1. In a floral rack including supporting legs, a structure made up of members crossed upon and pivoted to each other, and pivotally mounted upon the legs at certain of their places of crossing and adapted to move relatively in a plane paralleling the series of legs, said structure being disposed rearwardly of the said legs, the latter constituting the face of the said rack, a prong pivoted between its ends on one of the legs and extending both forwardly and rearwardly beyond the faces of same, and adapted to swing in a plane at right angles to the plane of the rack, the end of the prong rearward of the leg lying in the path of folding movement of the named structure, and an extension fixed on a part of the latter, said prong adapted to engage to swing it to a position in which its forward portion is caused to lie substantially parallel with the front face of said leg.

2. In a floral rack including supporting legs forming the face of said rack, a structure made up of members crossed upon and pivoted to each other and pivoted at their places of crossing to said legs, said members being disposed rearwardly of the said legs and adapted to swing relatively to each other in a plane paralleling the series of legs, a prong pivotally mounted between its ends upon one of the legs and in one position thereof extending both forwardly and rearwardly beyond said leg, means for maintaining the point of the prong in an extended position forward of the leg for receiving and supporting a display, the rearward extremity thereof lying in the path of swinging movement of one of the named members, such member having a lateral extension adapted in the collapsing movement of the rack to engage upon the rearwardly extended end of the prong to swing the same to a position in which the forward position thereof substantially parallels the said leg.

3. A collapsible floral rack including in its construction a substantially vertical support, a prong pivotally mounted between its ends on the support, and in one of its positions having both ends projecting beyond opposite sides of said support, said prong in another position lying substantially parallel to the plane of the support, and a member mounted adjacent the support near one side thereof and movable laterally past said support in a plane paralleling the same, said member constructed to directly engage one of the projecting ends of the prong to swing said prong into a position parallel to the support, and said member after such action also lying in the path of swinging movement of said end of the prong to maintain the prong in the last named position.

4. In a collapsible floral rack, the combination with a series of supports lying in a common plane, and a series of members crossing each other, the same being pivotally connected at their places of crossing, and pivoted thereat to the supports, said members being adapted to swing relative to each other in a plane substantially paralleling the said series of supports, of a prong pivoted between its ends to one of the supports and adapted when in one position to project beyond opposite sides of the plane thereof, while also adapted to be tilted into a position substantially paralleling the plane of the support, one of the members of said series of members in its swinging movement being arranged to directly engage one of the projecting ends of the prong so as to swing said prong to the second named position, certain of the members in their swing lying in the path of tilting movement of the prong to maintain it in the last named position.

5. A collapsible floral rack including in its construction a support having a face, a prong pivotally mounted between its ends on the support to swing in a plane at right angles to the said face, a member mounted on the support for movement in a plane paralleling said face of the latter, one end of the prong normally lying in the path of movement of said member and arranged to be operatively engaged by the latter with a wiping action thereon, the other end of said prong, normally lying in an angular position in respect to the face of the support, and being swung to a position substantially paralleling the latter by said wiping action.

6. A collapsible floral rack comprising a series of supports lying in a common plane, a prong pivotally mounted on one of said supports for swinging movement in a plane at right angles to said common plane from a first position in which it extends at an angle to said support, to a second position in which it lies substantially parallel with said support, a member mounted adjacent said support for movement laterally past the same in a direction parallel with said common plane, one end of said prong, when in said first position, projecting into the path of movement of said member so as to be directly engaged by it, by which engagement said prong is swung into its second position.

*7. A floral rack adapted to rest on a support and including in its construction an elongated standard, an impalement prong mounted on the same to project from a front face thereof, and a lazytongs structure mounted on the standard rearward of the rear face of said standard, said standard extending longitudinally upwardly from said support when said rack is in its operative position, said impalement prong being constantly visible at the front of said rack.*

*8. A floral rack adapted to rest on a support and including in its construction a pair of elongated standards, an impalement prong mounted on one of the standards to project from the front face thereof, and a lazytongs structure mounted on the standards rearward of the rear faces thereof, certain of the members of said structure at a place of crossing thereof being pivotally connected with said standards said standards extending longitudinally upwardly from said support when said rack is in its operative position, said impalement prong being constantly visible at the front of said rack.*

*9. A floral rack adapted to rest on a support and including in its construction an elongated standard, an impalement prong mounted on the same to project from a front face thereof, and a lazytongs structure mounted on the standard rearward of the rear face of said standard, said prong being adapted to project forwardly from said standard when said lazytongs structure is spread and when said lazytongs structure is closed to have its forward end retracted at least to a position to the front of the face of that standard on which it is mounted while yet being constantly visible from the front of said rack, said standard extending longitudinally upwardly from said support when the rack is in operative position.*

*10. A floral rack adapted to rest on a support and including in its construction a pair of elongated standards, an impalement prong mounted on one of the standards to project from the front face thereof, and a lazytongs structure mounted on the standards rearward of the rear faces thereof, certain of the members of said structure at a place of crossing thereof being pivotally connected with said standards, said prong being adapted to project forwardly from said standards when said lazytongs structure is spread and when said lazytongs structure is closed to have its forward end retracted at least to a position to the front of the face of that standard on which it is mounted while yet being constantly visible from the front of said rack, said standards extending longitudinally upwardly from said support when the rack is in operative position.*

*11. A floral rack adapted to rest on a support and including in its construction an elongated standard, an impalement prong mounted on the same to project from a front face thereof, and a lazytongs structure mounted on the standard rearward of the rear face of said standard, the front face of said standard carrying said prong and the forward part of said prong being constantly visible from the front of said rack whether the rack be spread or closed, said standard extending longitudinally upwardly from said support when the rack is in operative position.*

*12. A floral rack adapted to rest on a support and including in its construction a pair of elongated standards, an impalement prong mounted on one of the standards to project from the front face thereof, and a lazytongs structure mounted on the standards rearward of the rear faces thereof, certain of the members of said structure at a place of crossing thereof being pivotally connected with said standards, the front face of said one standard carrying said prong and the forward part of said prong being constantly visible from the front of said rack whether the rack be spread or closed, said standards extending longitudinally upwardly from said support when the rack is in operative position.*

CLARENCE J. WHITE.

References Cited in the file of this patent or the original patent

UNITED STATES PATENTS

| Number | Name | Date |
|---|---|---|
| 1,236,355 | Ratto | Aug. 7, 1917 |
| 1,909,503 | Randall | May 16, 1933 |
| 2,115,693 | White | Apr. 26, 1938 |